United States Patent [19]

Sakakura et al.

[11] Patent Number: 4,767,303
[45] Date of Patent: Aug. 30, 1988

[54] EXTRUDING APPARATUS FOR EXTRUDING SYNTHETIC RESIN

[75] Inventors: Kazuaki Sakakura, Oosaka; Minoru Takahashi, Saitama, both of Japan

[73] Assignees: Sumitomo Chemical Company, Ltd., Oosaka; Placo Co., Ltd., Saitama, both of Japan

[21] Appl. No.: 9,527

[22] Filed: Feb. 2, 1987

[30] Foreign Application Priority Data

Feb. 12, 1986 [JP] Japan .................................. 61-28182
Feb. 12, 1986 [JP] Japan .................................. 61-28183
Feb. 13, 1986 [JP] Japan .................................. 61-27891

[51] Int. Cl.⁴ .......................................... A01J 17/00
[52] U.S. Cl. ................................ 425/203; 425/205; 425/209; 366/266
[58] Field of Search ............... 425/200, 203, 205–209; 366/266

[56] References Cited

U.S. PATENT DOCUMENTS 3,535,737 10/1970 Hendry ........................ 425/203
4,112,519 9/1978 Kruder ........................ 425/203

FOREIGN PATENT DOCUMENTS

2304088 8/1973 Fed. Rep. of Germany ...... 425/205
2310463 9/1974 Fed. Rep. of Germany .
2520244 3/1977 Fed. Rep. of Germany .
2449787 11/1983 Fed. Rep. of Germany .
3248659 7/1984 Fed. Rep. of Germany ...... 425/203
3431063 3/1985 Fed. Rep. of Germany ...... 425/203
231029 5/1984 German Democratic Rep. .
1103897 2/1968 United Kingdom ............. 425/203
725891 4/1980 U.S.S.R. ........................ 425/203

Primary Examiner—Bernard Nozick
Attorney, Agent, or Firm—Nixon & Vanderhye

[57] ABSTRACT

A structure of an extruding apparatus for extruding a synthetic resin, including a first extruder and a second extruder having a vent hole, is disclosed. The extruding apparatus includes: a first extruder; and a second extruder having a cylinder with a vent hole, a supply port provided at the proximal end of the cylinder, and connected to a discharge port of the first extruder, a distribution/supply means provided inside the cylinder, having a plurality of passages for fluidically connecting the supply port and a space inside the cylinder, and distributing and supplying a molding material supplied to the supply port into the cylinder, a discharge port provided at the distal end of the cylinder, a screw shaft arranged inside the cylinder, and a motor for driving the screw shaft. An airtight vacuum chamber connected to the vacuum pump is mounted on an outer portion of the vent hole.

24 Claims, 6 Drawing Sheets

EXTRUDING APPARATUS FOR EXTRUDING SYNTHETIC RESIN

BACKGROUND OF THE INVENTION

A. Field of the Invention

The present invention relates to an extruding apparatus for extruding a synthetic resin and, more particularly, to an extruding apparatus for extruing a synthetic resin, comprising two extruders, a suply port of one of which is connected to a discharge port of the other.

B. Description of the Prior Art

A conventional extruding apparatus is disclosed in Japanese Patent Disclosure (Kokai) No. 48-79864. This extruding apparatus includes first and second extruders each having a cylinder which has a screw shaft therein. The second extruder, located at a front portion, has a single supply port connected to a discharge port of the first extruder, located at a rear portion. The supply port has a sectional area corresponding to the amount of a molding material supplied to the cylinder of the second extruder.

Accordingly, the molding material is softened by the first extruder, at the rear portion, into a semimolten state, and is supplied into a space between the cylinder and the screw shaft of the second extruder, through the supply port thereof. However, when the space becomes filled with semimolten resin, a problem occurs at the outer surface of a screw shaft except helical blades or flight of the screw shaft. More specifically, no axial feed effect occurs at the outer surface of the shaft, and the semimolten resin becomes attached to the outer surface of the shaft. The semimolten resin gradually accumulates on the already attached resin, and the sectional area of the space between the cylinder and the screw shaft becomes significantly reduced. In addition, the resin that has been attached for a long time is removed from the screw shaft and transferred to a discharge port. So that a discharge amount of the resin is unstabilized and quality of the extruded resin is degraded.

The second extruder disclosed in Japanese Patant Disclosure (Kokai) No. 48-79864 is provided with a vent hole for exhausting a gas generated when the molding material is melted. This conventional vent hole is situated adjacent to a position in a cylinder where pellets used as a molding material are heated and begin to melt, and passes through the cylinder perpendicular thereto. In addition, the vent hole is normally connected directly to a vacuum pump.

However, some of the resin melted near the vent hole is extruded outwardly therefrom, and is drawn by the vacuum pump thereby disturbing the operation of the pump. When the vacuum pump is unable to operate property, it must then be cleaned by temporarily stopping the operation of the extruder, or else the extruder must be driven by switching the vacuum pump to an auxiliary pump which is located in advance during cleaning of the pump. Such a process effectively prevents an extruding operation, and inevitably results in higher operating costs.

SUMMARY OF THE INVENTION

It is an object of the present invention to provide an extruding apparatus for extruding a synthetic resin, which can stabilize a discharge amount of a molten resin that is extruded from a discharge port of a second extruder, and can be continuously driven without the need for it to be periodically stopped.

The above object can be achieved by the following extruding apparatus for extruding a synthetic resin, which comprises:

a first extruder, having a first cylinder, a first supply port provided at a proximal end of the first cylinder, and supplying a molding material into the first cylinder, a first discharge port provided at a distal end of the first cylinder, and discharging the molding material contained in the first cylinder, a first screw shaft arranged inside the first cylinder, and having a helical blade, and a first motor connected to and driving the first screw shaft;

a second extruder, having a second cylinder, a second supply port, provided at a proximal end of the second cylinder, and supplying the molding material into the second cylinder, distribution/supply means provided inside the second cylinder, having a plurality of passages for fluidically connecting the second supply port and a space in the second cylinder, and distributing and supplying the molding material supplied in the second supply port into the second cylinder, through the passages, a second discharge port, provided at a distal end of the second cylinder, and discharging the molding material contained in the second cylinder, a second screw, arranged inside the second cylinder, and having a second screw shaft, and a second motor, connected to and driving the second screw shaft; and a coupling member for coupling the first discharge port of the first extruder and the second supply port of the second extruder.

In addition, a vent hole is provided in a side wall of the second cylinder, and an airtight vacuum chamber is connected to the vent hole, in an embodiment of this extruding apparatus.

The vent hole is formed in a cylinder side wall, which the distal end of the helical blade of the second screw shaft opposes when the blade moves downward, by its rotating. The axis of the vent hole is inclined, with respect to a horizontal line, at a predetermined angle, with the result that the outer end of the vent hole is at a higher level than its inner end.

DETAILED DESCRIPTION OF THE PREFERRED EMBODIMENT

An embodiment of the present invention will now be described in detail, with reference to the accompanying drawings.

Figure 1:
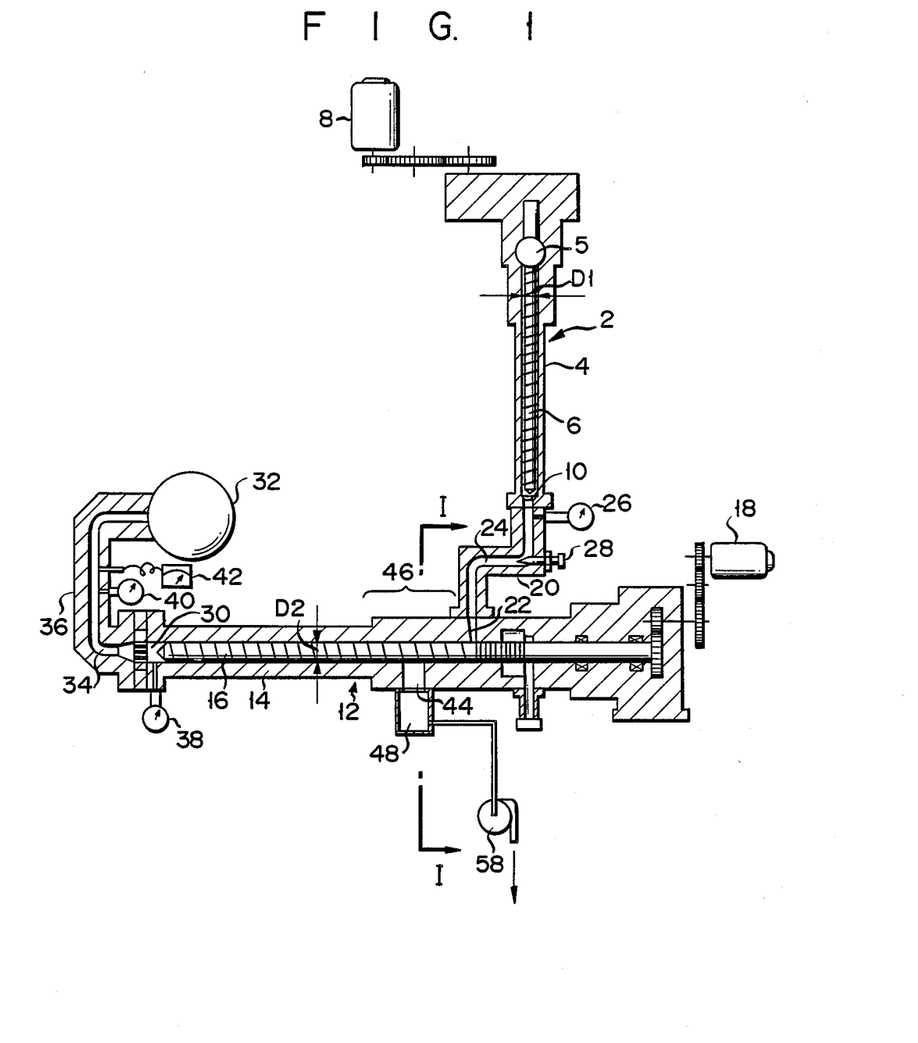
FIG. 1 is a plan view, partially in cross section, of a complete extruding apparatus according to the present invention.

As is shown in FIG. 1, an extruding apparatus according to the present invention includes first extruder 2 and second extruder 12. First cylinder 4 is provided for extruder 2. First supply port 5 for supplying a molding material into cylinder 4, is provided at the proximal end of cylinder 4. First screw shaft 6 for transferring the molding material supplied from port 5, is arranged inside cylinder 4, and first motor 8 for driving shaft 6 is mounted at the proximal end of extruder 2. Discharge port 10 is provided at the distal end of extruder 2. Extruder 2 includes second cylinder 14, and second supply port 22 for supplying the material into cylinder 14 is provided to the proximal end thereof. Second screw shaft 16 is arranged inside cylinder 14, and second motor 18 for driving shaft 16 is mounted at the proximal end of extruder 12. Coupling member 20 has first communication passage 24 for connecting discharge port 10 of cylinder 4 and supply port 22 of cylinder 14. First pressure gage 26 for measuring resin pressure in passage 24 and pressure control valve 28 for controlling the resin pressure to be supplied to extruder 2, are mounted to member 20.

Inner diameter D1 of cylinder 4 of extruder 2 and inner diameter D2 of cylinder 14 of extruder 12 are designed in accordance with the following relationship;

$$D1/D2 < 1$$

and more preferably, in accordance with the following equation;

$$D1/D2 = 0.9 \text{ to } 0.65$$

For example, when D1=100 mm, D2=about 130 mm.

Extruding port 30 of extruder 12 is coupled to extruding die 32 by connecting member 36 having passage 34. Second and third pressure gages 38 and 40 for measuring the internal resin pressure are provided near port 30, and are in the middle of second connecting member 36. Thermometer 42 for measuring molten resin temperature inside passage 34 is provided on member 36.

Figure 2:
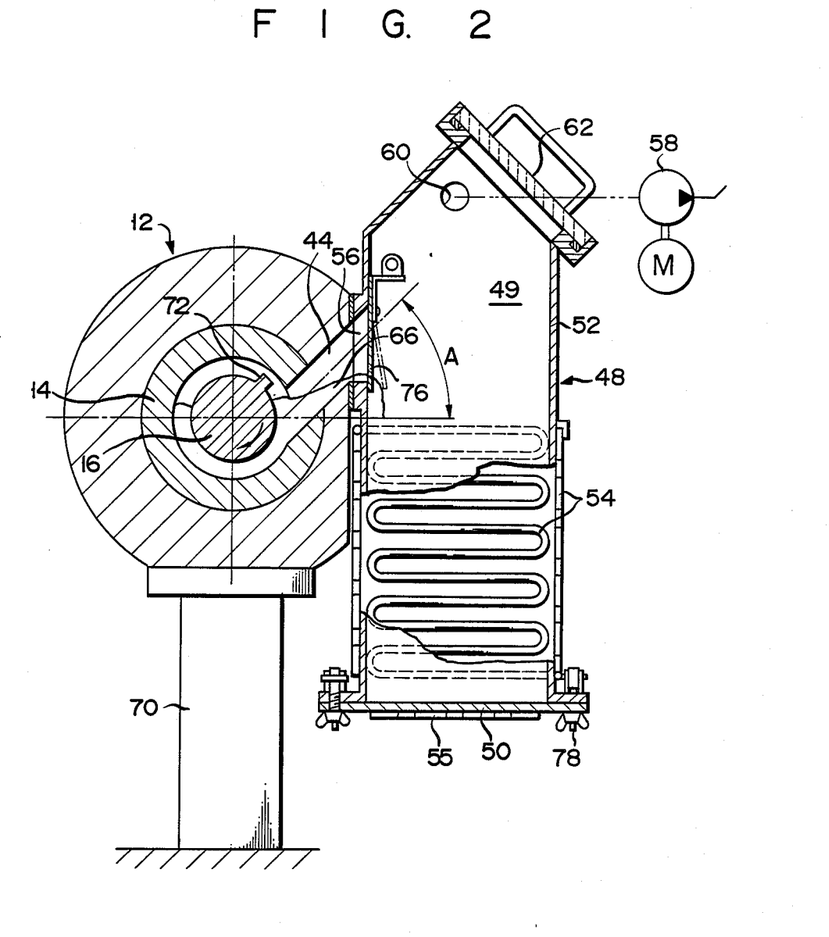
FIG. 2 is a vertical sectional view of a second extruder, taken along the line I—I of FIG. 1.

Vent hole 44 for exhausting a gas generated when the resin is melted is provided in supply portion 46 of extruder 12. More specifically, it is provided in a cylinder side wall, which the distal end of blade or flight 72 of shaft 16 opposes when blade 72 moves downward, by way of rotation of shaft 16, in an arrow direction, as is shown in FIG. 2. In this embodiment, hole 44 is provided such that its axis is inclined to the horizontal or vertical, at about 45°, and at the same time, is inclined with respect to a normal line of shaft 16, at an angle of 45°, in a direction opposite to the direction of rotation of shaft 16. However, inclination angle (A), with respect to the normal line of shaft 16, may be arbitrarily selected, as long as it falls within 30° to 90°.

As is shown in FIG. 2, airtight vacuum chamber 48 is connected to the outer end of hole 44. Chamber 48 is constituted by side wall 52, bottom cover 50, and top cover 62, and has a space 49 which is shielded from the ambient atmosphere. Space 49 is normally set in a vacuum. Opening 56 of hole 44 is provided in a side wall portion at an upper level, rather than in a middle portion, of chamber 48. Bottom cover 50 is mounted on a bottom portion of side wall 52, to be opened and closed by a suitable fastener 78, such as a bolt. Cooling coils 54 and 55 are attached to the outer surfaces of side wall 52 and bottom cover 50, respectively, and their inner surfaces serve as heat-exchange surfaces for cooling the resin overflowing from hole 44. The heat-exchange surfaces are provided at a predetermined distance below opening 56 of hole 44. On the other hand, pump-connecting port 60, coupled to vacuum pump 58, is provided in a side wall portion, at a level above that of opening 56. Top cover 62 for closing an upper opening of chamber 48 is formed partially of a transparent material, this transparent portion serving as a window for external observation of the interior of the airtight vacuum chamber.

Figure 3:
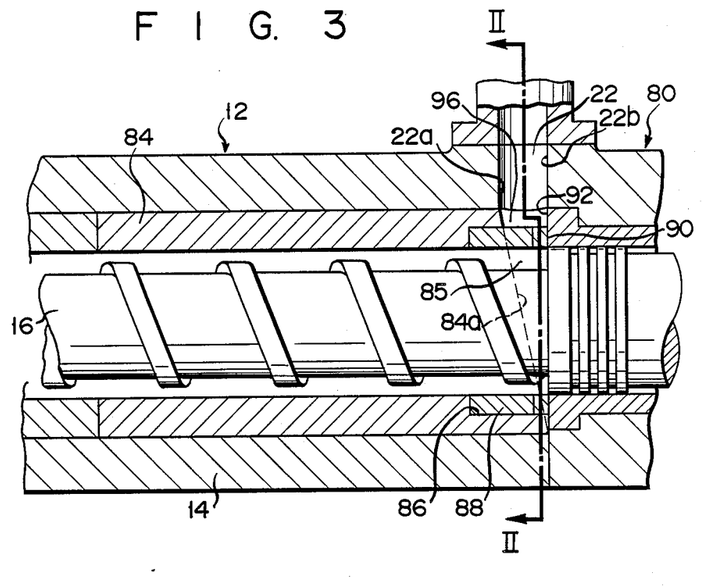
FIG. 3 is a partial sectional view of a supply portion of the second extruder.
Figure 7:
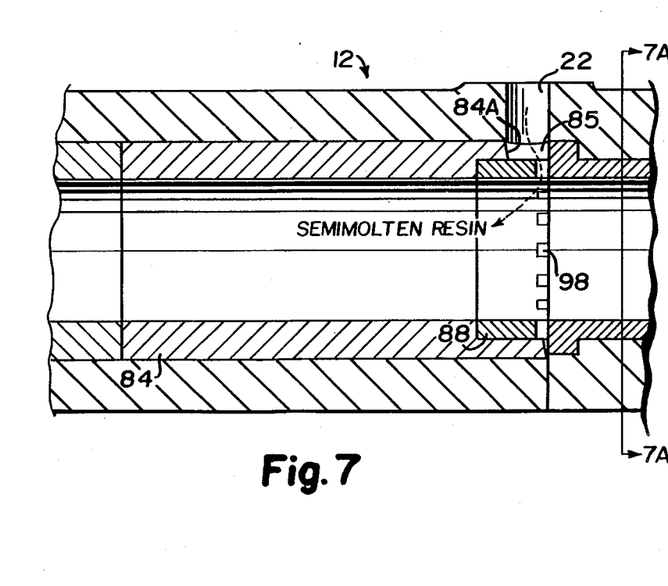
FIG. 7 is a longitudinal cross-sectional view showing a liner sleeve and distribution sleeve in the second extruder.
Figure 7A:
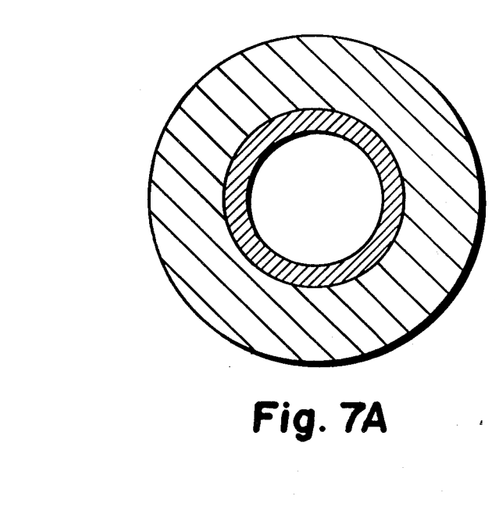
FIG. 7A is a cross-section of FIG. 7 taken along lines 7A—7A.
Figure 8:
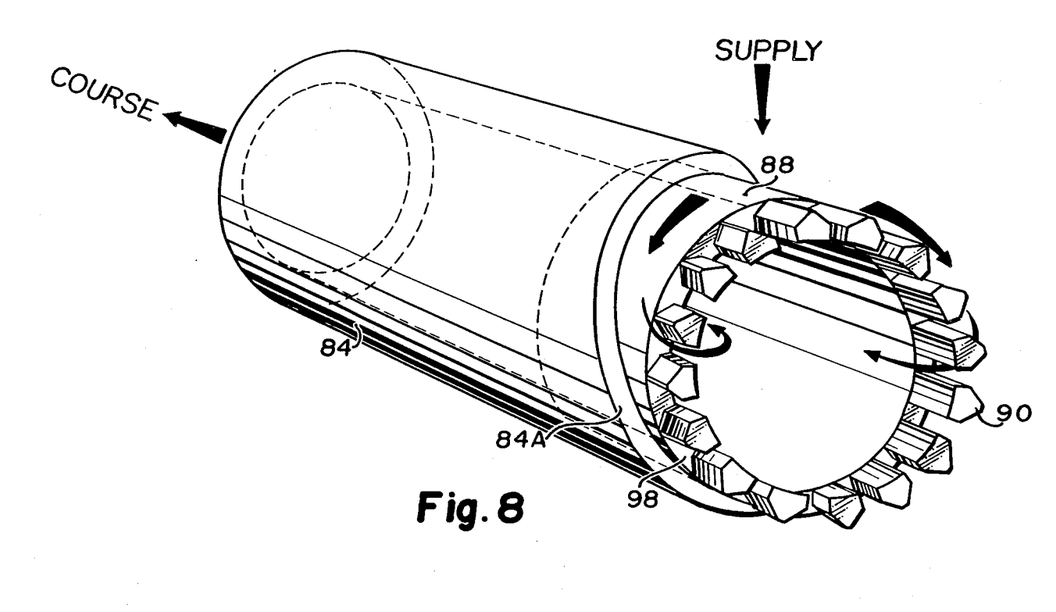
FIG. 8 is a perspective view of the annular liner sleeve and distribution sleeve 88 showing notched area 44 of the second extruder.

As shown in FIG. 7 in cross-section and in FIG. 8 in perspective, the second extruder 12 is shown in cross-section taken along cross-section line II—II in FIG. 3. Note the annular distribution sleeve line 84, inclined surface 84a, supply port 22, annular space 85 and annular distribution sleeve 88. As shown in perspective in FIG. 8, the end of annular liner sleeve 84 includes an annular distribution sleeve 88 with inclined surface 84a. At the proximal end 90 of the sleeve are a plurality of radially spaced notches 98 or supply holes. As depicted in FIG. 8, the semimolten resin is supplied through supply port 22 distributed around the annular distribution sleeve 84 and inclined surface 84a passing between notches 98 and into the interior of the sleeve.

The operation of the extruding apparatus will now be described below.

First, a thermoplastic synthetic resin or a mixture of this resin and a powder of a filler material is supplied as a raw material from supply port 5 of first extruder 2. First and second screw shafts 6 and 16 are rotated by motors 8 and 18, respectively, and selected portions of cylinders 4 and 14 are heated to a predetermined temperature, by a conventional method. As a result, the resin in a semimolten state, prepared by extruder 2, is discharged from discharge port 10, and is supplied, through communication passage 24, to supply port 22 of second extruder 12. The semimolten resin supplied into the cylinder of extruder 12 is transferred toward the distal end by second screw shaft 16, and is further heated during transfer. A gas generated while the resin is passing through cylinder 14 is drawn and exhausted by vacuum pump 58, through vent hole 44 formed to supply portion 46, and through airtight vacuum chamber 48.

On the other hand, the molten resin minus the gas, is further mixed by shaft 16. The resultant resin is then supplied to die 32 from extruding port 30, through passage 34. Upon supply to die 32, the molten synthetic resin is molded into a desired shape.

When the molten resin passes near the inner end of hole 44, a part thereof is extruded into hole 44. However, since hole 44 is inclined by a predetermined angle, as is shown in FIG. 2, most of the extruded resin returns by its own weight, into cylinder 14, and is then milled again by shaft 16, and mixed with another portion of resin. Thereafter, the resin is mixed uniformly and supplied to die 32.

In the apparatus of this embodiment, the amount of resin supplied to die 32 is controlled by the rotational frequency of shaft 16, and the rotational frequency of shaft 6 of extruder 2 is controlled so that the pressure indicated by second pressure gage 38 will be always maintained substantially constant. In addition, pressure control valve 28 is controlled when needed, to stabilize the pressure indicated by gage 38. This control may be manually executed by an operator, while observing the pressure of gage 38 and the amount of molten resin supplied from hole 44 and extruded into the airtight vacuum chamber. Alternatively, an automatic control device provided with a plurality of sensors may be mounted to automatically control the rotational frequency of shaft 6.

Furthermore, in the extruding apparatus according to the present invention, since inner diameter D1 of the cylinder of first extruder 2 is smaller than inner diameter D2 of the cylinder of second extruder 12, extruder 12 is less adversely affected by variations in the amount of resin extruded from extruder 2. Since the rotational speeds of the respective shafts can be easily and finely controlled, the rotational frequency of the screw shaft of extruder 2 may be selected to stabilize the pressure, so that the amount of resin extruded from the vent hole can be reduced.

In addition, since the cylinders of the first and second extruders have different diameters, the rotational speed of the screw shaft of the first extruder can be relatively increased. For this reason, the plasticizing efficiency and melting efficiency of the pellets are increased.

On the other hand, the inner diameter of the cylinder of the second extruder is formed larger, and the screw shaft of the second extruder is rotated more slowly, by about 10 to 50% of that of the screw shaft of the first extruder. Accordingly, the resin transferred inside the cylinder is heated sufficiently by a heater, but is not overheated because of the low rotational speed of the second screw shaft, resulting in less degradation of the resin.

However, when the ratio of the inner diameters of cylinders of two extruders is smaller than that described above, almost no above-mentioned effects can be obtained by cylinders having different inner diameters. When the ratio is larger than that described above, the rotational frequency of the screw shaft of the first extruder becomes faster than is needed, thereby adversely affecting the resin.

In this extruding apparatus, when the entire apparatus is operating, the semimolten pellets and the filler material are transferred axially with respect to cylinder 14 and shaft 16, and the gas, produced when the resin is melted, is exhausted through hole 44 during transfer. A part of resin 66 in a molten or semimolten state is extruded into hole 44 as described above, but the resin or the filler material in hole 44 is forced to return into cylinder 14, by force of gravity, due to hole 44 being inclined as shown in FIG. 2. In addition, since hole 44 is inclined, with respect to the normal line of the screw shaft, at a predetermined angle, in a direction opposite to the direction of rotation of the screw shaft, the resin emerging from hole 44 is scraped by blade 72, as shaft 16 rotates, thereby most of the remaining resin then returning into cylinder 14.

However, the molten or semimolten resin trapped in hole 44 and attached to its inner wall surface gradually expands, pushes and opens normally closed valve 76, and then is extruded into airtight vacuum chamber 48.

The resin extruded into chamber 48 flows downward, and is stored therein. At the same time, the gas and the resin are separated, the gas being drawn out and removed by pump 58.

When the resin stored in chamber 48 approaches connecting port 56 of the vent hole, pump 58 is temporarily stopped to equalize the pressure inside chamber 48 with an ambient atmosphere, fastener 78 is loosened to open bottom cover 50, and the solidified resin is removed from chamber 48. Thereafter, cover 50 is closed and fastened by fastener 78, and pump 58 is restarted.

As is described above, in the extruding apparatus of the present invention, the resin extruded from the vent hole is solidified in chamber 48. For this reason, the resin can be easily removed, and the resin extruded into the airtight vacuum chamber can be re-used, because it is almost uncontaminated by a polluted ambient atmosphere. In addition, the interior of chamber 48 can be easily observed, since top cover 62 includes a transparent portion. Moreover, top and bottom covers 62 and 50 can be opened to facilitate cleaning of the interior of chamber 48.

When inclination angle A of hole 44 is set within the range described above, with respect to the normal line of cylinder 14, the resin supplied into hole 44 can be easily returned to the cylinder. When angle A is set outside the above range, the amount of resin supplied into hole 44 is increased.

When the angle of inclination of hole 44, with respect to the horizontal, is set to about 45°, chamber 48 can be easily mounted thereon, and the supplied amount of the molten resin can be reduced.

As a modification of this embodiment, two such airtight vacuum chambers 48 may be provided and mounted to be alternately slid to opening 56 of hole 44. When one of the airtight vacuum chambers becomes full of resin, and the resin is to be removed, another airtight vacuum chamber may then be connected to opening 56, replacing the first chamber. Thus, in this modification, the efficiency of the extruding apparatus can be further increased.

A structure surrounding supply port 22 of second extruder 12 according to the present invention will now be described.

Figure 5:
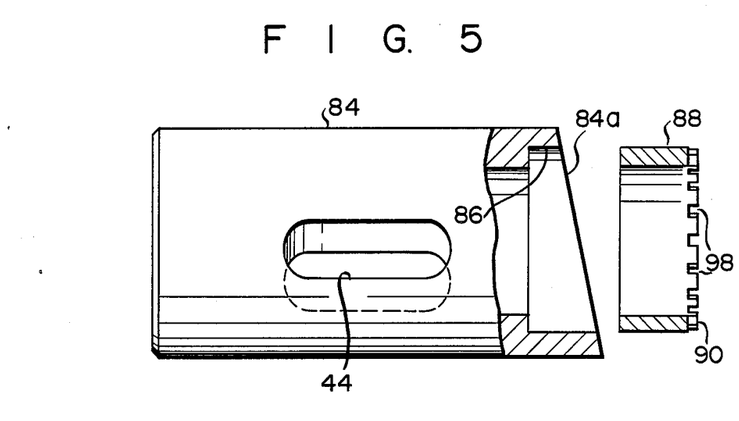
FIG. 5 is a partial sectional view of a liner sleeve and a distribution sleeve of the second extruder.

As is shown in FIG. 3, annular liner sleeve 84 is mounted inside cylinder 14 of extruder 12. Inclined surface 84a is formed at a proximal end of sleeve 84, to be inclined with respect to an axis of the liner sleeve, and space 85 defined by surface 84a and an inner surface of cylinder 14 is connected to port 22, as is shown in FIG. 5. Distribution sleeve-inserting portion 86 of a large diameter is formed at the proximal end of sleeve 84, from the proximal end face to a predetermined depth. Annular distribution sleeve 88 is inserted in portion 86, and partially projects from the proximal end of sleeve 84. Proximal end 90 of sleeve 88 abuts against end face 92 of drive portion 80, as is shown in FIG. 3. Space 85 further defined by an outer surface of sleeve 88 forms distribution passage 96 for distributing the molten resin, supplied from port 22, along the outer surface of sleeve 88. A plurality of supply grooves 98 whereby passage 96 communicates with the space in cylinder 14 are provided on the circumference of the proximal end of sleeve 88.

Figure 4:
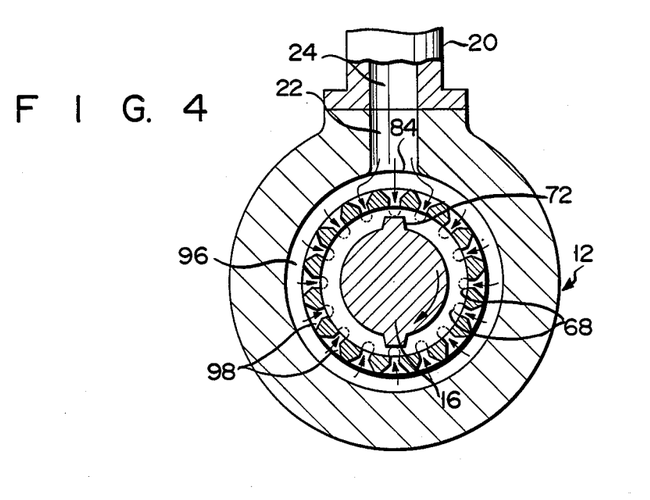
FIG. 4 is a vertical sectional view of the second extruder, taken along the line II—II of FIG. 3.

As is shown in FIG. 4, sixteen supply grooves 98 are formed on the circumference, at equal angular intervals, in this embodiment. The number of grooves 98 is preferably between 8 and 20. However, depending on the inner diameter of the cylinder or the nature of the resin, the number may be outside the above range.

Figure 6:
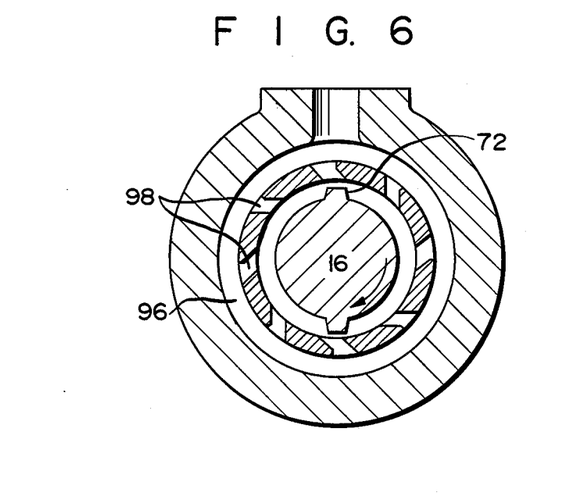
FIG. 6 is a vertical sectional view of the second extruder, showing a modification of the distribution sleeve.

Each groove 98 expands outwardly and radially, as is shown in FIG. 4, to thereby have a funnel-shape. As a modification, groove 98 may be formed so that its axis is inclined, with respect to the normal line of screw shaft 16, at a predetermined angle, in a direction opposite to direction of rotation of shaft 16 as is shown in FIG. 6.

In this embodiment, longitudinal vent hole 44 is provided through cylinder 14 and liner sleeve 84 of second extruder 12, as is shown in FIG. 5.

Near the supply port of the second extruder formed as described above, the semimolten resin is supplied from first extruder 2 into passage 96, through port 22, and is extruded into cylinder 14 from a plurality rf grooves 98 of sleeve 88. The semimolten resin 68 sequentially projects into each groove 98, to form a small projection as indicated by a broken line in FIG. 4, is scraped off by blade 72 of shaft 16, and then transferred toward port 30.

In this extruding apparatus, the semimolten resin supplied to port 22 is first supplied to passage 96. Since the width of passage 96 gradually reduces downward from port 22, the resin inside the distribution passage moves downward, and is sequentially supplied into the cylinder, from the supply grooves. As a result, the amount of resin is reduced in accordance with the volume of the distribution passage. As a result, the feed pressure of the resin is made uniform throughout passage 96, and an equal amount of resin is supplied from each groove 98 into cylinder 14.

As is shown in FIG. 5, since a plurality of supply grooves 98 are formed at the end of sleeve 88, they can be easily disassembled and cleaned when the color or the resin material is to be changed.

As has been described above, in the extruding apparatus according to the present invention, the semimolten resin extruded from discharge port 10 of first extruder 2 is supplied to supply port 22 of second extruder 12, through communication passage 24. The semimolten resin is supplied into distribution passage 96 of extruder 12, and then projects inside cylinder 14, from supply grooves 98 formed on the circumference of distribution sleeve 88, to form a small projection therein. The resin is sequentially scraped off by blade 72 of rotating screw shaft 16, so that again becomes pelletized. The pelletized resin is sequentially transferred axially, along with the rotation of screw shaft 16.

Accordingly, in the extruding apparatus according to the present invention, since the semimolten resin is distributed from the first extruder through a plurality of supply grooves, and is then supplied into the cylinder of the second extruder, the amount supplied by each supply groove is small, and the resin projecting inwardly from the supply groove, to form a small projection, is sequentially scraped off by the blade before it comes into contact with the surface of the shaft. Therefore, unlike a conventional extruding apparatus, the semimolten resin does not tend to become attached to the outer surface of the screw shaft nor rotate together therewith, but is instead pelletized, whereby it can be reliably transferred by each blade. As a result, the amount of resin discharged from the second extruder is stabilized, and the resin quality is uniform.

In addition, since a vent hole for exhausting by-produced gas is provided at a portion near the supply port, the surface area of the pelletized semimolten resin is increased near the vent hole, with the result that the gas included therein is completely exhausted out.

What is claimed is:

1. An extruding apparatus for extruding a synthetic resin, comprising:
   a first extruder, having
   a first cylinder having inner diameter D1,
   a first supply port provided at a proximal end of said first cylinder, and supplying a molding material into said first cylinder,
   a first discharge port provided at a distal end of said first cylinder, and discharging the molding material contained in said first cylinder,
   a first screw shaft arranged inside said first cylinder, and having a helical blade, and
   a first motor connected to and driving said first screw shaft;
   a second extruder, having
   a second cylinder having inner diameter D2 larger than said inner diameter D1 of said first cylinder,
   a second supply port, provided at a proximal end of said second cylinder, and supplying the molding material into said second cylinder,
   means for distributing and supplying a semimolten resin along and around the screw shaft provided inside said second cylinder and having a plurality of passages for fluidically connecting said second supply port with a space inside said second cylinder, for distributing and supplying the molding material supplied to said second supply port into said second cylinder, through the passages,
   a second discharge port, provided at a distal end of said second cylinder, and discharging the molding material contained in said second cylinder,
   a second screw shaft, arranged inside said second cylinder, and having a helical blade, and
   a second motor, connected to and driving said second screw shaft; and
   a coupling member for coupling said first discharge port of said first extruder and said second supply port of said second extruder.

2. An apparatus according to claim 1, wherein said inner diameters D1 and D2 are determined in accordance with the following equations:

$$D1/D2 = 0.9 \text{ to } 0.65.$$

3. An apparatus according to claim 1, wherein said means for distributing and supplying the semimolten resin along and around the screw shaft comprises: a liner sleeve mounted inside said second cylinder; and a distribution sleeve mounted inside a proximal end of said liner sleeve, and having a plurality of grooves on a circumference of one of its ends, and said grooves constituting said passages.

4. An apparatus according to claim 3, wherein each groove of said distribution sleeve is inclined with respect to a normal line of said second screw shaft, at a predetermined angle, in a direction opposite to a direction of rotation of said second screw shaft.

5. An apparatus according to claim 3, wherein the proximal end of said liner sleeve is cut obliquely, and a resultant space is situated below the supply port of said second cylinder, so that said space forms a distribution passage for supplying a molten resin uniformly into each of said grooves.

6. An apparatus according to claim 3, wherein each groove of said distribution sleeve expands radially to have a funnel-shape.

7. An apparatus according to claim 6, wherein an angle of inclination of said groove is set within a range of from 5° to 45°.

8. An apparatus according to claim 1, further comprising a vent hole provided in a side wall of said second cylinder, and an airtight vacuum chamber connected to said vent hole.

9. An apparatus according to claim 8, wherein said airtight vacuum chamber includes a bottom cover formed to be opened and closed, and a top cover partially formed by a transparent plate, so that an interior can be observed therethrough.

10. An apparatus according to claim 8, wherein said vent hole is formed in a side wall portion of said second cylinder, which the distal end of the helical blade of said second screw shaft opposes when said helical blade moves downward by rotation of said second screw shaft, and an axis of said vent hole is inclined, with respect to a horizontal line, at a predetermined angle, so that an outer end of said vent hole is situated at a higher level than an inner end thereof.

11. An apparatus according to claim 10, wherein an angle of inclination of said vent hole, with respect to a horizontal line, is set to be 45°.

12. An apparatus according to claim 10, wherein the axis of said vent hole is further inclined, with respect to a normal line of said second screw shaft, at a predetermined angle, in a direction opposite to a direction of rotation of said second screw shaft.

13. An apparatus according to claim 12, wherein an angle of inclination of said vent hole, with respect to the normal line, is set within a range of from 30° to 90°.

14. An apparatus according to claim 8, further comprising a vacuum pump connected to said airtight vacuum chamber.

15. An apparatus according to calim 14, wherein an opening of the outer end of said vent hole is formed in a side wall portion, at a slightly higher level than a middle portion of said airtight vacuum chamber, and a connecting port communicating with said vacuum pump is formed at a side wall portion, at a higher level than said opening.

16. An apparatus according to claim 15, wherein a cooling coil is mounted on at least one region of the side wall of said airtight vacuum chamber.

17. An apparatus according to claim 16, wherein said cooling coil is mounted on said bottom cover of said airtight vacuum chamber.

18. An extruding apparatus comprising:
a cylinder
a supply port provided at a proximal end of said cylinder, and supplying a resin molding material into said cylinder;
a discharge port provided at a distal end of said cylinder, and discharging the resin molding material contained in said cylinder;
a screw shaft arranged inside said cylinder, and having a helical blade;
a motor connected to and driving said screw shaft;
a vent hole formed in a side wall portion of said cylinder which a distal end of the helical blade of said screw shaft opposes when said helical blade moves downward by rotation of said screw shaft, an axis of said vent hole having a predetermined angle with respect to a vertical line, so that an outer end of said vent hole is situated at a higher level than its inner end and wherein the axis of said vent hole is inclined, with respect to a normal line of said screw shaft, at an angle within the range of from 30° to 90° in a direction opposite to a direction of rotation of said screw shaft;
an airtight vacuum chamber connected to said vent hole and mounted on the side wall portion of the cylinder of the extruder including a bottom cover, a top cover and side walls, wherein the vacuum chamber allows gas which is evolved from the semimolten resin molding material to readily be released under a reduced pressure prevalent within that chamber, while allowing that resin which enters a vent hole at the time of gas removal and is cured there to be collected within the chamber; and
a vacuum pump connected to said airtight vacuum chamber.

19. An apparatus according to claim 18, wherein an angle of inclination of said vent hole, with respect to the horizontal line, is set to be 45°.

20. An apparatus according to claim 18, wherein said bottom cover is formed to be opened and closed, said a top cover is partially formed of a transparent plate, so that an interior can be observed therethrough.

21. An apparatus according to claim 18, wherein an opening of the outer end of said vent hole is formed in a side wall portion, at a slightly higher level than a middle portion of said airtight vacuum chamber, and a connecting port for communicating with said vacuum pump is formed in a side wall portion, at a higher level than said opening.

22. An apparatus according to claim 18, wherein a cooling coil is mounted on at least one region of the side wall of said airtight vacuum chamber.

23. An apparatus according to claim 18, wherein the cooling coil is mounted on said bottom cover of said airtight vacuum chamber.

24. An extruding apparatus for extruding a synthetic resin, comprising:
a first extruder, having
a first cylinder,
a first supply port provided at a proximal end of said first cylinder and supplying a resin molding material into said first cylinder,
a first discharge port provided at a distal end of said first cylinder, and discharging the resin molding material contained in said first cylinder,
a first screw shaft arranged inside said first cylinder, and having a helical blade, and
a first motor connected to and driving said first screw shaft;
a second extruder, having
a second cylinder,
a second supply port, provided at a proximal end of said second cylinder, and supplying the molding material into said second cylinder,
a second discharge port, provided at a distal end of said second cylinder, and discharging the resin molding material contained in said second cylinder,
a second screw shaft, arranged inside said second cylinder, and having a helical blade,
a second motor, connected to and driving said second screw shaft,
a vent hole formed in a side wall portion of said second cylinder, which a distal end of the helical blade of said second screw shaft opposes when said helical blade moves downward by rotation of said second screw shaft, an axis of said vent hole having a predetemined angle with respect to a horizontal line, so that an outer end of said vent hole is situated at a higher level than its inner end and wherein the axis of said vent hole is inclined, with respect to a normal line of said screw shaft, at an angle within the range of from 30° to 90° in a direction opposite to a direction of rotation of said screw shaft, an airtight vacuum chamber connected to said vent hole and mounted on the side wall portion of the cylinder of the extruder including a bottom cover formed to be opened and closed, a top cover and side walls, wherein the vacuum chamber allows gas which is evolved from the semimolten resin molding material to readily be released under a reduced pressure prevalent within that chamber, while allowing that resin which enters a vent hole at the time of gas removal and is cured there to be collected within the chamber, and a vacuum pump connected to said airtight vacuum chamber; and a coupling member for coupling said first discharge port of said first extruder and said second supply port of said second extruder.

* * * * *